United States Patent [19]
Lemke

[11] Patent Number: 4,459,616
[45] Date of Patent: Jul. 10, 1984

[54] APPARATUS FOR PRODUCING CUSTOMIZED PRINTS OF STILL FRAME TELEVISION SCENES

[75] Inventor: James U. Lemke, Del Mar, Calif.

[73] Assignee: Eastman Kodak Company, Rochester, N.Y.

[21] Appl. No.: 274,891

[22] Filed: Jun. 18, 1981

[51] Int. Cl.³ .............................................. H04N 5/84
[52] U.S. Cl. .................................................... 358/244
[58] Field of Search .................. 358/76, 10, 332, 244, 358/244.1, 244.2

[56] References Cited

U.S. PATENT DOCUMENTS

| | | | |
|---|---|---|---|
| 2,548,829 | 4/1951 | Sziklai et al. | 358/332 X |
| 2,965,703 | 12/1960 | Loughlin | 358/76 |
| 2,977,407 | 3/1961 | Hirsch | 358/76 |
| 3,029,691 | 4/1962 | Goddard et al. | |
| 3,152,897 | 10/1964 | Huboi et al. | |
| 3,184,307 | 5/1965 | Letzer | |
| 3,519,347 | 7/1970 | Bowker et al. | |
| 3,617,626 | 11/1971 | Bluth et al. | |
| 3,653,759 | 4/1972 | Klein | |
| 3,677,641 | 7/1972 | King et al. | |
| 3,683,111 | 8/1972 | Southworth | |
| 3,697,174 | 10/1972 | McCune | |
| 3,756,718 | 9/1973 | Letzer | |
| 3,800,070 | 3/1974 | Barbieri | 358/76 |
| 3,928,719 | 12/1975 | Sasabe et al. | 358/332 X |
| 3,947,110 | 3/1976 | Yamada | |
| 3,962,722 | 6/1976 | Ciciora | 358/10 |
| 4,017,680 | 4/1977 | Anderson et al. | 358/107 X |
| 4,037,249 | 7/1977 | Pugsley | 358/76 |
| 4,123,775 | 10/1978 | Bugni | 358/10 |
| 4,148,066 | 4/1979 | Saylor | |
| 4,231,061 | 10/1980 | Freeman | 358/76 |
| 4,249,197 | 2/1981 | van Spaandonk et al. | 358/10 |

FOREIGN PATENT DOCUMENTS 2074413 10/1981 United Kingdom ............... 358/332

*Primary Examiner*—Aristotelis M. Psitos
*Attorney, Agent, or Firm*—Robert F. Cody

[57] ABSTRACT

By means of the invention, hard copy prints having customized color composition and contrast are provided. To effect such customizing, apparatus according to the invention derives color composition information directly from the face of the television set the display of which is to be copied. Having normalized the sensitivity of the hard copy printer so that its copy-print color-matches the display of the television set in question, the television set is adjusted to one's personal taste. Then a wand, as is preferred, is brought against the picture-tube face of the television set to pick off the preselected color composition of the image to be copied, thereby to set the color exposure within the hard copy printer. Attendantly, the printer produces a print virtually precisely like that to which the television set was subjectively adjusted.

10 Claims, 4 Drawing Figures

APPARATUS FOR PRODUCING CUSTOMIZED PRINTS OF STILL FRAME TELEVISION SCENES

BACKGROUND OF THE INVENTION

1. Field of the Invention

This invention relates in general to photography and in particular to apparatus for use in producing photographic prints which are customized as to color composition.

2. Description Relative to the Prior Art

One of the more complex technologies is that involving color. Physiological as well as psychological factors influence our interpretation of color, regardless of the actual color content of an image which is being viewed. Even for a pure spectral color such as red, of wavelength 700 m$\mu$ (m$\mu$ = milli-micron), or blue, of wavelength 400 m$\mu$, different viewers will (may) perceive such colors differently; and what is pleasing to one viewer may not be as pleasing to another.

The art of photographic printing is replete with examples of printers designed for the production of color prints. Exemplary apparatus may be found in the following U.S. Pat. Nos.: 3,029,691; 3,152,897; 3,184,307; 3,519,347; 3,653,759; 3,697,174; and 3,756,718.

U.S. Pat. Nos. 3,519,347 and 3,697,174 are of particular interest since they are directed to the solution of a problem (inherent in color printing) which is identified as "color subject failure" ... wherein the photographic printer in question, based on an assessed large area transmission density (LATD) of a color negative, misinterprets the color content of the main subject image of the negative, and incorrectly exposes, color-wise, photographic print material. Even with a photographic printer including apparatus for solving the color subject failure problem, the prints which are produced by such printer are prints embracing color content "as viewed by the printer".

While not directed to the color aspect of subject failure in a printer, the teaching of U.S. Pat. No. 3,677,641 concerns "subject failure", per se, in the photographic printing of a negative, the solution to such problem being to allow the operator of the printer to zero in on the main subject of a negative to be printed, thereby to derive necessary exposure information to make the desired print. Except for the matter of the operator-selection of the main subject, prints produced by the teaching of U.S. Pat. No. 3,677,641 are determined by what the printer itself "sees".

U.S. Pat. No. 3,947,110 discusses various "failures" in the printing operation and provides for customer-involvement in the determination of exposure in a printer.

Related to the art of producing photographic prints from photographic negatives is the art of producing hard copy prints of scenes corresponding to video signal information: With the widespread availability of television receivers, especially color television receivers, there is significant interest in being able to convert television displays into copies thereof. Representative prior art in this connection may be found in U.S. Pat. Nos. 3,683,111; 3,617,626; and 4,148,066. Compounding the problem of producing hard copies of color television displays, however, is the aforenoted problem that color displays are a matter of subjective taste. What one viewer likes may not be what another viewer likes ... and what each such viewer "sees" may be different from what the hard copy printer "sees". Thus, it is inevitable that prior art hard copies are, at best, compromises which will be reasonably satisfactory to everyone.

SUMMARY OF THE INVENTION

By means of the invention, hard copy prints having customized color composition and contrast are provided. To effect such customizing, apparatus according to the invention derives color composition information directly from the face of the television set the display of which is to be copied. Having normalized the sensitivity of the hard copy printer so that its copy-print color-matches the display of the television set in question, the television set is adjusted to one's personal taste. Then a wand, as is preferred, is brought against the picture-tube face of the television set to pick off the preselected color composition of the image to be copied, thereby to set the color exposure within the hard copy printer. Attendantly, the printer produces a print virtually precisely like that to which the television set was subjectively adjusted.

The invention will now be described with reference to the figures of which

Before addressing the matter of hardware for practicing the invention, it is considered worthwhile to review briefly certain aspects of color which are incident to the invention: As is known, any three primary colors (tri-stimuli) define a triangular section in color space; and by mixing various amounts of the primary colors, any color identifiable on or within the defined triangular section may be produced. Since, depending on the shape of the spatial triangular section defined by the particular tri-stimuli which are employed, more saturated colors are often identifiable outside the spatial triangle, it has been convenient to employ an enlarged, but ficticious, equilateral triangle of color space that contains all saturated spectral colors as perceived by a "standard observer", the standard observer being as defined by the International Commission on Illumination (CIE). Thus, all colors, and saturations, are discernible within the ficticious color space triangle.

Figure 1:
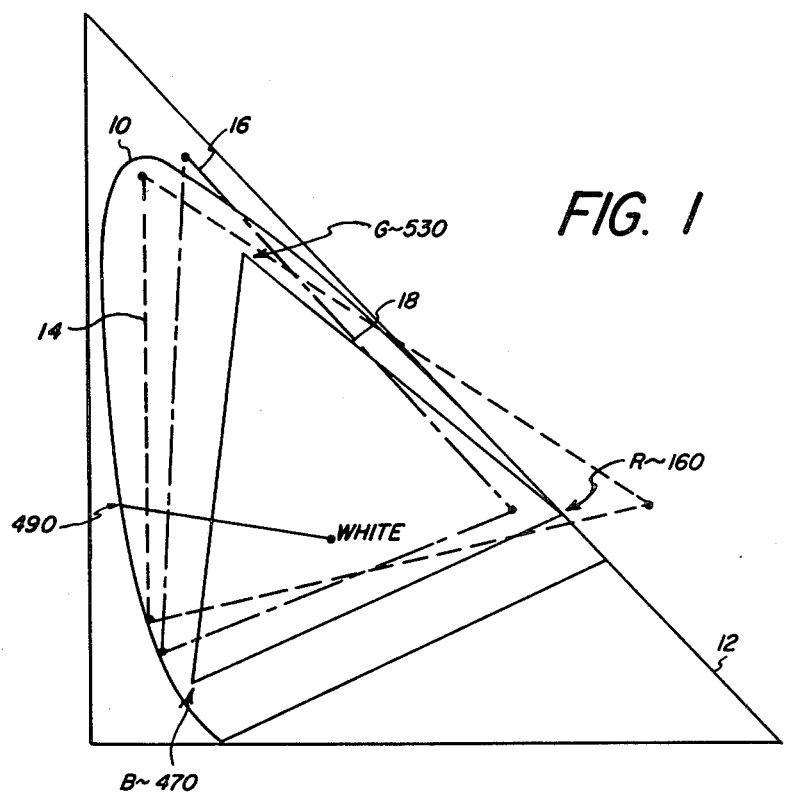
FIG. 1 is a diagram useful in describing the invention.

Referring to FIG. 1, the well-known CIE chromaticity diagram 10 is depicted, such diagram resulting from a spatial transformation of the above indicated equilateral triangle into a right triangle 12. Were everyone to have the same acuity and preference to color as the standard observer, and were all visual systems capable of matching the colors defined within the CIE chromaticity diagram 10, there would be no need for the present invention. But the fact of the matter is that different people have different color capability, to say nothing of the psychological factors which cause different people to prefer different shades of the same color, or one color more than another.

Tri-stimuli color space triangles 14, 16 form part of FIG. 1 and correspond to the respective acuities of a pair of hypothetical observers different from the standard CIE observer. It will be readily apparent that the observer associated with color space triangle 14 will be able to see greater saturation of, for example, cyan 490 than will the observer associated with color space triangle 16. And, even if the same color space triangle 14 (or 16) of FIG. 1 represents the acuity of two different observers, it is highly likely that the two such observers will, psychologically, prefer different colors and saturations.

In any photographic printing system it is, of course, desirable to have print material capable of matching the colors which are identifiable on and within the CIE chromaticity diagram 10, thereby to enable the print material to "see" as well as the standard CIE observer. Much progress has been made in this connection and, indeed, photographic print material is now available which fairly approximates the acuity of the human eye. FIG. 1 shows a color space triangle 18 representative of the color acuity of a particular—positive—color print material, the triangle 18 corresponding, not to the acuity of a human observer, but rather to the less demanding color space triangle associated with the specific phosphor-produced colors employed in standard color television sets. (It will be appreciated that the phosphors which are employed throughout the television industry are productive of blue of about wavelengths 470 m$\mu$, of green of about wavelengths 530 m$\mu$, and of red of about wavelengths 610 m$\mu$, whereby the same NTSC color signal will produce the same color composition on different make television sets.) Thus, while the print material associated with color space triangle 18 cannot "see" as well as either hypothetical observer, it can "see" any color that appears on the face of a television set. Wherever there is overlap between the color space triangle (14 or 16) associated with an observer and the color space triangle (18) of the print material/television phosphors, virtually exact reproductions as to that observer of any "overlap" color and saturation may be produced on the television set and print material. For the observer in question to see a given "overlap" color and saturation on the face of a television set, that same color and saturation, therefore, may be effected on the print material which is associated with the overlap. From FIG. 1 it can be seen that although the two hypothetical observers "see" colors differently from each other—and differently from the print material—there is a wide range of color composition (as defined by and within the color space triangle 18) from which the subjective tastes of the hypothetical observers can be satisfied.

Figure 2:
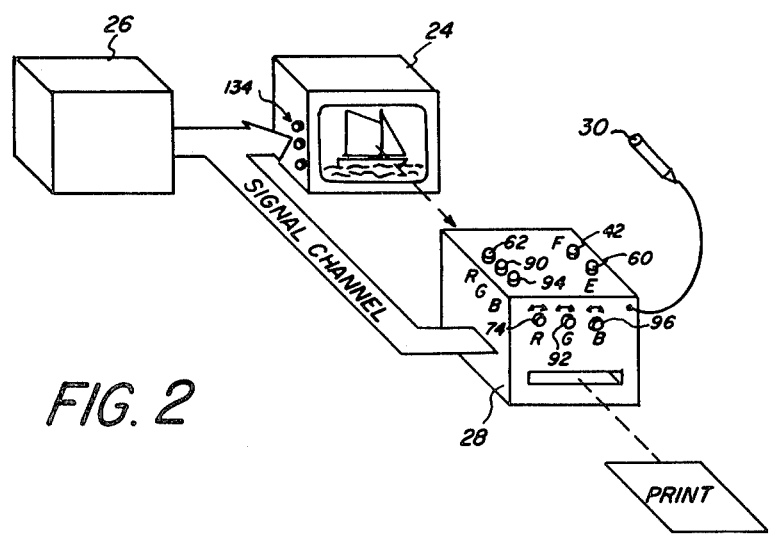
FIG. 2 is an overall block diagram depicting apparatus according to the invention.

With the above as background, reference should now be had to FIG. 2 for an overview of apparatus according to the invention: A television receiver 24 displays a still frame corresponding to video signals produced by a still frame device 26, the image on the face of the television receiver being optically projected to a hard copy printer 28. Before any still frame display is produced, however, the hard copy printer is calibrated to produce prints that match color-wise the phosphors of the television receiver. This is done, for example, by applying an NTSC signal, corresponding to a saturated red of wavelength 610 m$\mu$ from the printer 28 to the television receiver 24, and then projecting the red scene to the printer to produce a red print. If the print color does not precisely match the saturation of the color on the picture-tube face of the television set (as perceived by the observer of print and television set), the printer is adjusted so as to effect the desired match between print and television display. Then, the above process is repeated for saturated blue of wavelength 470 m$\mu$; and for saturated green of wavelength 530 m$\mu$.

Having normalized the printer 28 so that its set-up prints perfectly match the discrete colors which were displayed on the television set 24, a still frame color signal is applied to the television set to produce and display a particular scene. Assuming the scene displayed on the television set is color-wise not to the liking of the observer, the observer adjusts the tint and saturation controls of the television set so that the display thereon is to his liking. Then, by means of a color-sensing wand 30 which is brought directly against the principal subject displayed on the television set 24, the color exposure balance within the printer 28 is automatically set. Attendantly, when the printer shutter is actuated, a three-color exposure is effected which is such as to be productive of a print that virtually precisely matches color-wise the subjectively-tuned display on the television set.

Figure 3:
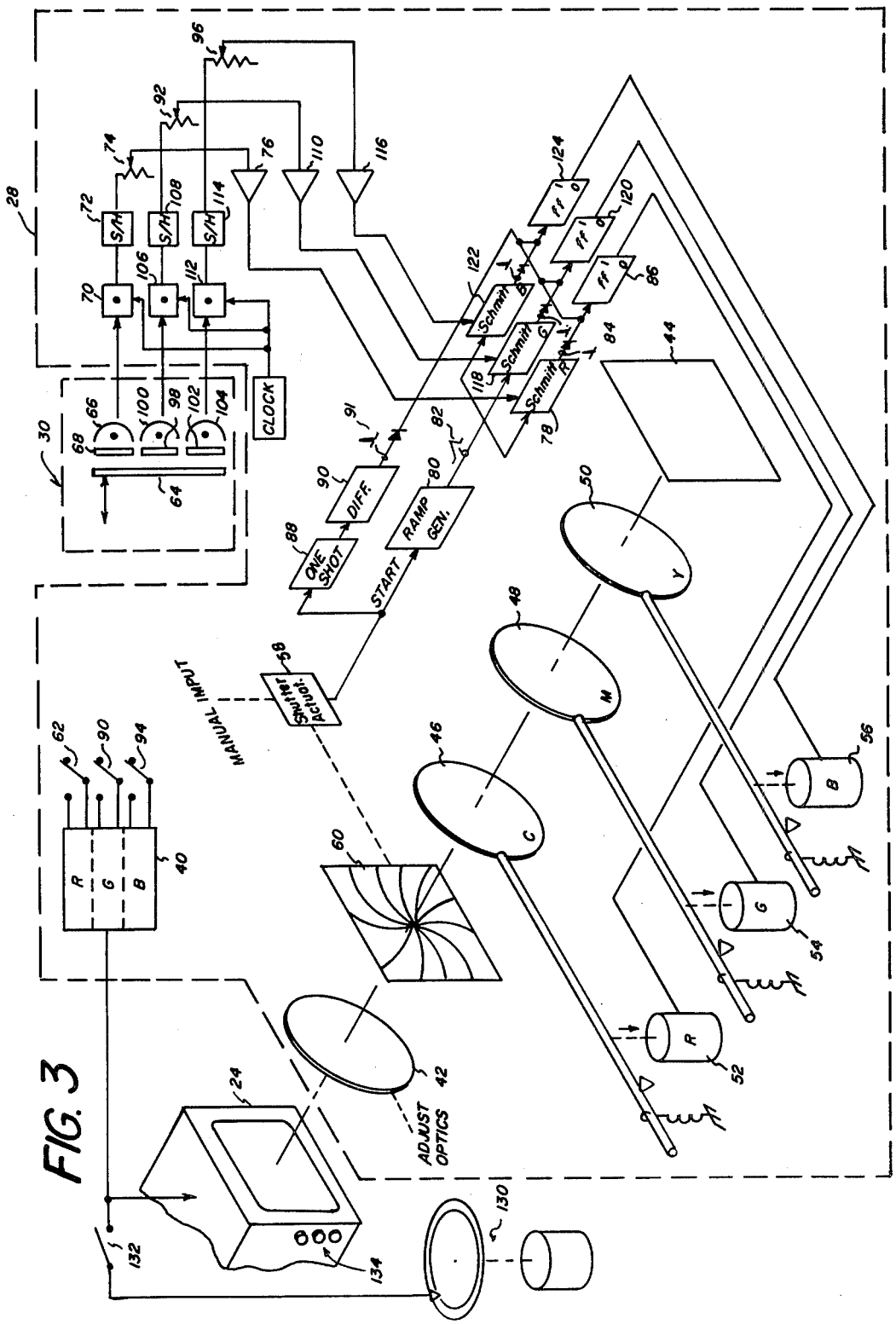
FIG. 3 is a schematic block diagram of apparatus according to the invention.

Reference should now be had to FIG. 3 for a detailed description of apparatus embodying the invention (like characteristics being employed for the corresponding parts of FIGS. 2 and 3). A signal generator 40 for producing three discrete NTSC signals corresponding respectively to saturated red, green, and blue colors, as noted above, is connected to a standard color television set. The display on the television set is focused, by means of adjustable optics 42, upon a focusing plane 44 adapted to support therein positive color print material corresponding to the color space triangle 18 of FIG. 1. Disposed for insertion between the optics 42 and the focusing plane 44 are cyan, magenta, and yellow filters 46, 48, 50 respectively, the filters serving to limit (by virtue of being complementary to the phosphor-produced colors of a standard color television set), respectively, the red, green, and blue exposures of the print material in the focusing plane 44. The filters 46, 48, 50 are positionable into the optical path between the optics 42 and focusing plane 44 by means of respective relays 52, 54, 56, all of which are shown in their energized states; and overall exposure control of the print material in the focusing plane 44 is effected by means of a manually actuated (58) shutter 60. The shutter 60 may be of any conventional form and, in this embodiment of the invention, the shutter which is employed is one of fixed duration. See FIG. 4.

With a "red" calibration signal applied to the television set 24 (a switch 62 being closed), the television display assumes a saturated red color. According to the invention in its presently preferred form, the wand 30 is then placed against the face of the television set. This action trips a shutter mechanism 64 (which may be of any suitable form known to those in the art) within the wand 30, thereby causing a "red" photodetector 66 to receive a red illuminant via an appropriate red filter 68. The signal produced by the photodetector 66 in response to its received illumination is gated (70) to a sample-and-hold circuit 72 which develops a "red" signal across a "red" potentiometer 74 set to a pre-calibration reference position that corresponds to minimal exposure of the print material. The signal across the potentiometer 74 is applied, via suitable electronics 76, to a trigger circuit 78 ... and effectively held there. A print is then made of the red display on the television set 24 by actuating (58) the shutter 60.

Actuation of the shutter 60 causes a ramp signal generator 80 to initiate a ramp signal 82 and, when the ramp signal level reaches the level of the wand-produced signal applied to the trigger circuit 78, a pulse 84 is produced. The pulse 84 sets a flip-flop circuit 86 to its ONE state, thereby energizing the relay 52 to pull-in the cyan filter 46 to shut down the red exposure of the print material. The print material, after suitable development, is then visually compared "by the observer" with the red display on the television set 24. If there appears to be a shade discrepancy between the print and television display, the potentiometer 74 is adjusted accordingly, and a second red print similarly made. Again a visual comparison is made between print and television display, and the whole process repeated until the observer obtains the desired match. Then, the switch 62 is opened.

To reset the relay-actuating flip-flop circuit 86 after the cyan filter is "pulled-in", i.e. to drop out the cyan filter 46 when the shutter 60 closes, a one-shot circuit 88—which produces a negative-going square wave pulse having a duration that is preferably just a bit longer than the duration of the shutter 60 opening—is employed. That is, the square wave pulse output of the circuit 88 is differentiated (90) to produce a spike pulse 91 that resets the flip-flop circuit 86 to its ZERO state, thereby disabling the relay 52.

Figure 4:
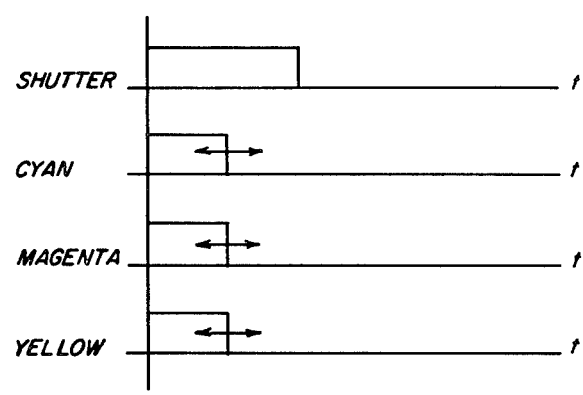
FIG. 4 illustrates a set of timing diagrams which are useful in describing the practice of the invention.

With the "red" potentiometer 74 having been set to provide the desired match between the television display and print material, the above calibration process is repeated for saturated green and blue colors. That is, the switch 90 is actuated to effect a green television display; and a "green" potentiometer 92 is set so that the "green" relay 54 pulls-in the magenta filter 48 at the appropriate time (FIG. 4) to effect a match between the green display and a green print thereof. Similarly, a "blue" signal is applied to the television set 24 by closing a switch 94, and a match between the blue television display and a print thereof is effected by proper adjustment of a "blue" potentiometer 96 (FIG. 4). Thus, the color space triangle associated with the printer is made to conform with, i.e. overlap, the color space triangle associated with the television set 24.

(Again referring to FIG. 3, green illumination from the television set 24 passes via the shutter 64, through a green filter 98, to a "green" photodetector 100. Blue illumination from the television set 24 passes via the shutter 64, through a blue filter 102, to a "blue" photodetector 104. The "green" channel includes a gate 106, a sample-and-hold circuit 108, and appropriate electronics 110. The "blue" channel includes a gate 112, a sample-and-hold circuit 114, and appropriate electronics 116. As was the case with the "red" exposure control, trigger and flip-flop circuits 118, 120 are employed for "green" exposure control; and trigger and flip-flop circuits 122, 124 are employed for "blue" exposure control.)

Before going further with the description of the invention, note is made of the interesting fact that although two observers may perceive a given color differently, both such observers will undoubtedly have little or no trouble discerning a color match involving such color, albeit that the color match to one observer might look different than it does to the other observer. Thus, once the printer is calibrated for a given television set, it (the printer) may be used to produce customized prints for any observer of that television set.

With the above as background, and with the apparatus of FIG. 3 calibrated as discussed, a color display of a scene (to be hard copied) is made to appear on the face of the television set 24. To this end, NTSC still frame video signals—which may be provided, for example, by a video disc player 130—are applied via a switch 132 to the television set 24. The scene displayed on the television set is then critically viewed as to color composition by an observer desirous of a hard copy print of the display. Assuming the observer finds the color balance not to his subjective liking, he adjusts the tint and saturation controls 134 of the television set until he gets a display that suits him. Then, the observer places the shutter-end of the wand 30 against the principal subject appearing in the television display, thereby actuating the shutter 64 within the wand 30. Instantly, tri-stimuli signals, corresponding to the selected color composition of the principal subject of the display, are developed, respectively, across the "red", "green", and "blue" potentiometers 74, 92, 96. As noted above, the tri-stimuli signals developed across the potentiometers 74, 92, 96 correspond with exposure time control signals. Thus, when the printer shutter 60 is actuated, a correct exposure (by the displayed scene) of print material in the focusing plane is effected, the exposure time control signals serving to pull-in the cyan, magenta and yellow filters 46, 48, 50 as required. Attendantly, the print material, when developed, results in hard copy of the scene displayed on the television set . . . and which hard copy has the particular color balance chosen by the observer when he adjusted the television set 24.

The invention has been described in detail with particular reference to preferred embodiments thereof, but it will be understood that variations and modifications can be effected within the spirit and scope of the invention. For example, it may be expedient, during calibration procedures, to display a color bar pattern of three discrete saturated colors instead of employing three separate calibration displays of saturated colors, thereby to shorten the time necessary to calibrate the printer.

What is claimed is:

1. Apparatus for producing a customized color print of a still frame display appearing on a color television set equipped with tint and saturation controls for regulating the color composition of its display, said apparatus comprising:
  (a) means for focusing the display of said television set upon a focusing plane,
  (b) color print material having substantially the same tri-stimuli color space definition as does the set of phosphors of said color television set,
  (c) signal responsive means for regulating the exposure of said print material by respective colors corresponding to the phosphors of said television set,
  (d) means for producing signals corresponding to the color composition of the display on said television set, said signals being applied to said signal responsive means for regulating that means, and
  (e) means for supporting said color print material in said focusing plane, whereby, when said exposure regulating means has been appropriately calibrated, said apparatus is capable of producing a copy print of said still frame display, said copy print having substantially the same color composition as said still frame display as provided by the subjective settings of said television set tint and saturation controls.

2. Apparatus of claim 1 wherein said means for producing signals corresponding to the color composition of the display on said television set is means for directly sensing colors appearing on the face of said television set and, in response thereto, for producing corresponding color signals.

3. The apparatus of claim 2 wherein said means for directly sensing colors is a signal-producing color-responsive wand which is of a type that may be applied directly against the principal subject appearing on the face of said television set.

4. The apparatus of claim 3 wherein said signal responsive means for regulating exposure is comprised of a set of color filters for conveying illuminance of wavelengths about 530 m$\mu$, 470 m$\mu$, and 160 m$\mu$ from the display on said television set to said color print material.

5. The apparatus of claim 1 wherein said signal responsive means for regulating exposure is comprised of a set of color filters for conveying illuminance of wavelengths about 530 m$\mu$, 470 m$\mu$, and 160 m$\mu$ from the display on said television set to said color print material.

6. Apparatus for producing a copy print of a still frame scene appearing on a color television set having tint and saturation controls, said copy print having color composition virtually identical to that of said still frame scene, comprising
 (a) means for focusing said scene upon a focusing plane,
 (b) photographic color print material having substantially the same tri-stimuli color space definition as does the set of phosphors of said color television set,
 (c) means for supporting said photographic print material in said focusing plane,
 (d) signal responsive means disposed in the optical path between said television scene and said focusing plane for respectively controlling the exposure of said print material by colors corresponding to the discrete phosphors of said television set,
 (e) means for producing, and applying to said signal responsive means, signals corresponding to the red, blue, and green still frame intensities appearing on the face of said television set, and
 (f) means for calibrating said apparatus prior to the exposure of said print material by said scene on said television set, said calibrating means comprising
  (1) means for producing reference red, green, and blue colors on the face of said television set and
  (2) adjustable means cooperative with said exposure control means for providing reference exposures of print material to effect thereon replication of said reference red, green, and blue colors whereby when a still frame scene is imaged upon unexposed photographic print material in said focusing plane, a copy print of said scene is produced, said copy print having virtually identical color composition to that of said scene and reflecting the particular subjective settings of the tint and saturation controls of said television set.

7. The apparatus of claim 6 wherein said means cooperative with said television set for producing color intensity signals is means for receiving color illuminance directly from the face of said television set and, in response thereto, producing corresponding color signals for controlling the red, green, and blue exposures of said print material.

8. The apparatus of claim 7 wherein said means for receiving color illuminance directly from the face of said television set is a wand that is of a type that may be applied against the face of the television set to produce signals corresponding to the red, green, and blue color content of the image appearing on said television set.

9. The apparatus of claim 8 wherein said means disposed in the optical path between said television scene and said focusing plane is a set of color filters for conveying, selectively, illuminance of wavelengths about 530 m$\mu$, 470 m$\mu$, and 160 m$\mu$.

10. The appartus of claim 6 wherein said means disposed in the optical path between said television scene and said focusing plane is a set of color filters for conveying, selectively, illuminance of wavelengths about 530 m$\mu$, 470 m$\mu$, and 160 m$\mu$.

* * * * *